Figure 1:
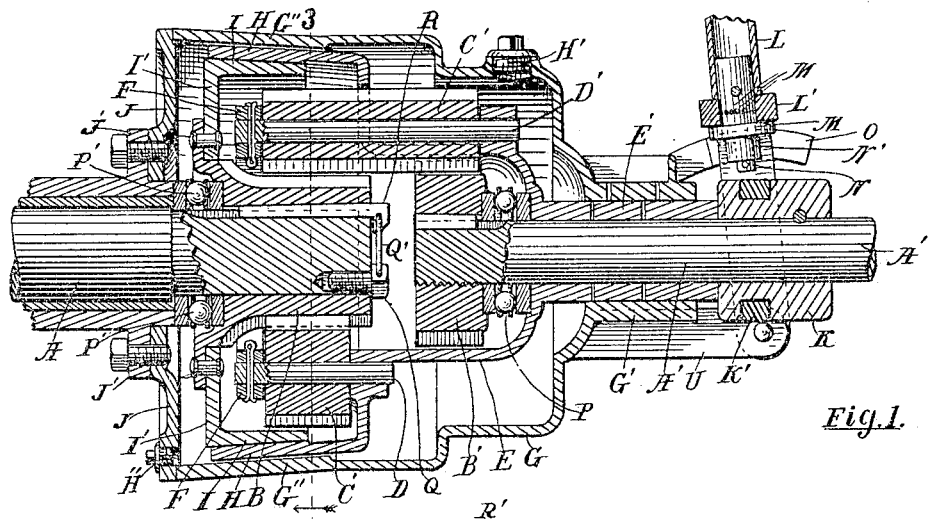

No. 793,224. PATENTED JUNE 27, 1905.
W. J. PERKINS.
COMBINED CLUTCH AND REVERSING MECHANISM.
APPLICATION FILED MAR. 13, 1903.

2 SHEETS—SHEET 1.

Witnesses
Palmer A. Jones
Georgiana Chace

Inventor
Willis J. Perkins
By Luther V. Moulton
Attorney

No. 793,224. PATENTED JUNE 27, 1905.
W. J. PERKINS.
COMBINED CLUTCH AND REVERSING MECHANISM.
APPLICATION FILED MAR. 13, 1903.

2 SHEETS—SHEET 2.

Witnesses
Palmer A. Jones.
Georgiana Chase

Inventor
Willis J. Perkins
By Luther V. Moulton
Attorney

No. 793,224.								Patented June 27, 1905.

UNITED STATES PATENT OFFICE.

WILLIS J. PERKINS, OF GRAND RAPIDS, MICHIGAN.

COMBINED CLUTCH AND REVERSING MECHANISM.

SPECIFICATION forming part of Letters Patent No. 793,224, dated June 27, 1905.

Application filed March 13, 1903. Serial No. 147,691.

*To all whom it may concern:*

Be it known that I, WILLIS J. PERKINS, a citizen of the United States, residing at Grand Rapids, in the county of Kent and State of Michigan, have invented certain new and useful Improvements in a Combined Clutch and Reversing Mechanism; and I do hereby declare the following to be a full, clear, and exact description of the invention, such as will enable others skilled in the art to which it appertains to make and use the same.

My invention relates to improvements in combined clutch and reversing mechanisms, and more particularly to such devices to be used in connection with boats propelled by non-reversible engines and screw-wheels. It is, however, obviously useful in other relations, such as hoisting machinery, automobiles, &c.

The object of my invention is to provide a compact, simple, self-adjusting, self-locking, and durable device that can be readily attached to the adjacent ends of two alined shafts and easily removed therefrom; to provide a self-lubricating device that will run the driven shaft in either direction, the driver revolving in one direction only, or to release the same at pleasure; to inclose the moving parts of the device in a non-rotating case; to provide means for engaging and disengaging the clutch members, and to provide the same with certain new and useful features hereinafter more fully described, and particularly pointed out in the claims.

My device consists, essentially, of a fixed case inclosing the adjacent ends of the shafts, gears on the respective ends of the shafts, planet-gears connecting the gears on the shafts and with their axes rotative about the axis of the said shafts, said gears also being adapted to reverse the rotation of the driven shaft, a clutch to hold said planet-gears from rotating about the axis of the shafts and to connect the axes of the planet-gears to the driving-shaft to cause them to rotate therewith, and also to release the said gears to run idle, and a lever for operating said clutch and having improved means for holding the clutch as adjusted, said lever also having means for operating a throttle to the engine to prevent the latter from running too fast when the clutch is wholly released, as will more fully appear by reference to the accompanying drawings, in which—

Figure 2:
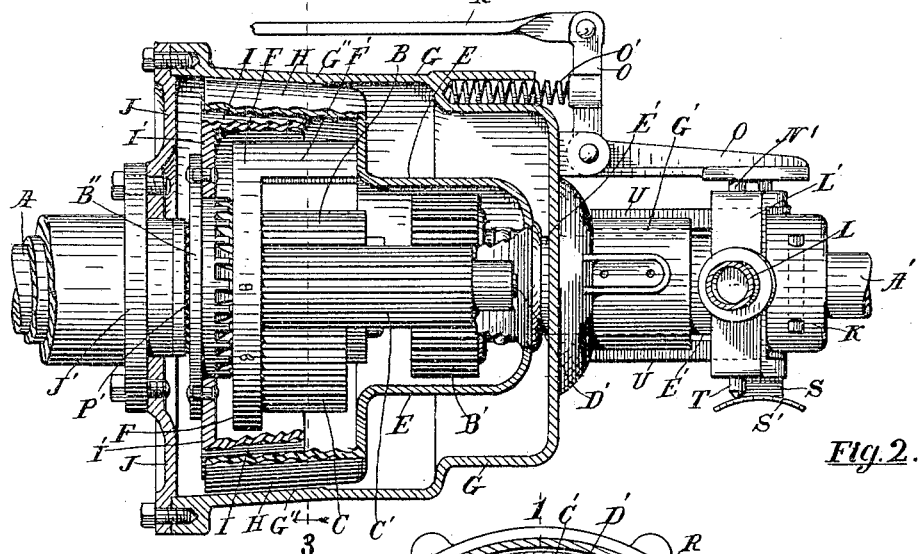
Figure 3:
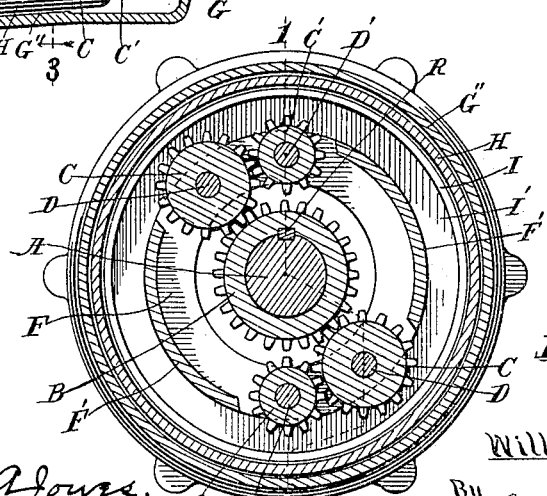
Figure 4:
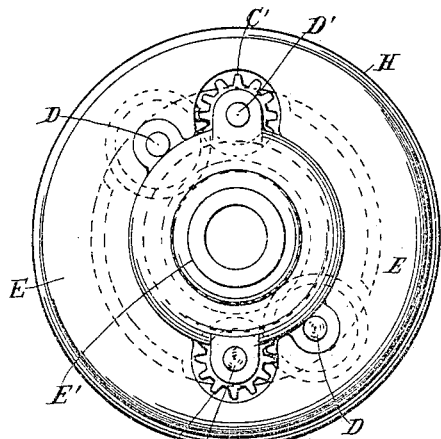
Figure 5:
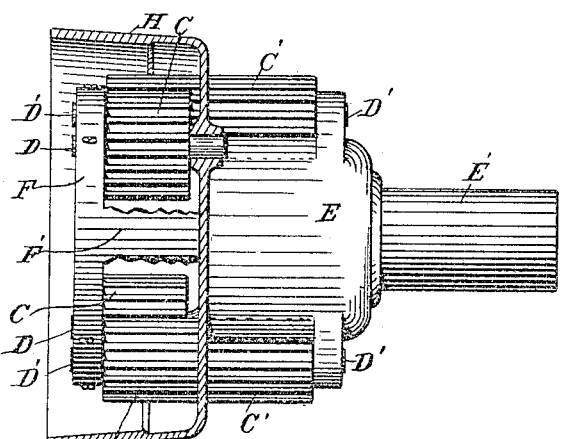
Figure 6:
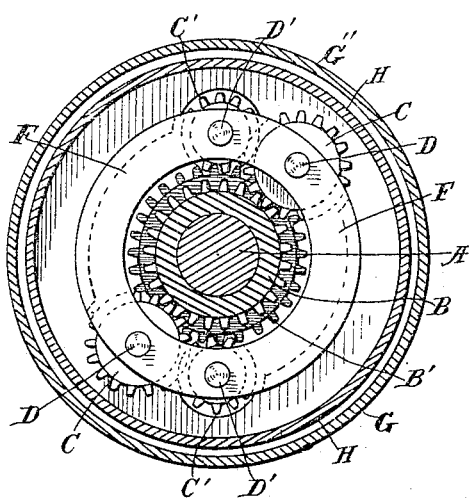
Figures 7, 8:
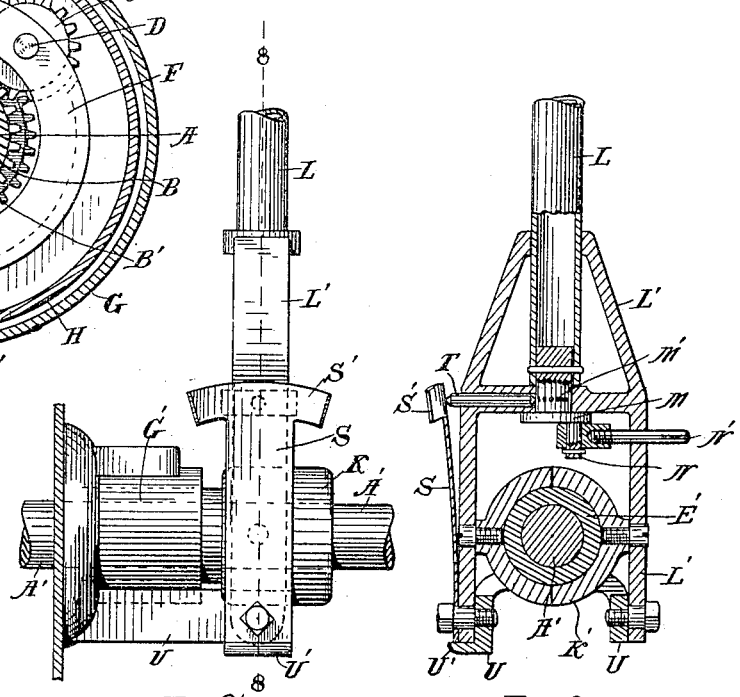

Figure 1 is a vertical section of a device embodying my invention, taken on the line 1 1 of Fig. 3; Fig. 2, a plan view of the same with a portion broken away to show the construction; Fig. 3, a transverse vertical section on the line 3 3 of Figs. 1 and 2 looking to the left; Fig. 4, an end elevation of the reciprocating clutch member and the planet-gears; Fig. 5, a side elevation of the same broken away in part; Fig. 6, an end view of the same, together with all of the gears and the case, showing from the direction opposite to Fig. 4; Fig. 7, a detail of the operating-lever and adjacent parts in side elevation, and Fig. 8 a vertical section of the same on the line 8 8 of Fig. 7.

Like letters refer to like parts in all of the figures.

A represents any driving-shaft which is rotated continuously in one direction by any suitable means; A', the driven shaft, which is driven in the same direction as the driving-shaft or in the opposite direction or allowed to be stationary at pleasure. To accomplish these results, I provide gears B and B' on the adjacent ends of the shafts and connect these gears by one or more trains of two planet-gears C and C'. The gears C engage the driving-gear B and also engage the gears C", and the latter are prolonged opposite the gear B' and engage the same, whereby the motion of the driven shaft is the reverse of the driving-shaft when the axes of the planet-gears are stationary. These planet-gears are all journaled on the axis-pins D D', mounted in a suitable frame E, rotative about the axis of the shafts and provided with portions F', extending between the planet-gears and terminating in a ring F to support the pins D D'. To permit the rotation of this frame and to support the same in place and to secure its horizontal adjustment, it is preferably provided with a sleeve E' at one end, rotative on the shaft A' and affording a bearing for the shaft.

To inclose and protect the gearing and to support the bearing of the shaft A', also to provide a fixed clutch member and to retain oil to lubricate the device, I provide a case G, having at one end a bearing G', in which the sleeve E' is rotative and longitudinally movable, and an annular detachable head J at the other end detachably secured to a flange J' on the bearing of the shaft A. The device is thus supported by the bearing of the shaft A and can be readily detached as occasion requires. To drive the shaft A' the same as the shaft A, the frame E is preferably connected by a clutch to the driving-shaft, and thus caused to rotate therewith. To reverse the rotation of the shaft A', the frame is held stationary, preferably by a clutch, and the shaft A' is then driven through the described trains of gears. I prefer the conical clutch mechanism shown, consisting of a reciprocating and rotative member H, attached to the frame E and adapted when moved in one direction to engage a driving member I, attached to the shaft A and driven thereby, and when moved oppositely to engage the fixed clutch member G" and when in mid-position to be clear of both of said clutch members.

The driving clutch member I is preferably connected to the gear B by a flange I', secured to a flange on the gear B. The gear can thus be made separately and more readily cut, and the fixed clutch member is preferably a portion of the interior of the case G. Thrust-bearings P and P' are provided, as shown, and to secure the gears B and B' against detachment the gear B is provided with the usual key R, and in addition a screw Q is inserted in the shaft A, with its head overhanging and engaging the end of the gear, and both the key and screw are then secured in place by a fastening of wire or other suitable material inserted in holes in the key and screw and secured therein. The gear B' is secured by screw-threads in the gear and shaft and a key, as shown in Fig. 1. To lubricate the contents thereof, the case may be provided with any suitable inlet H' for inserting oil at the top and an opening H" at the bottom to draw off the surplus oil.

To operate the clutch member H, the shaft A' is preferably longitudinally movable and the frame E moved thereby by engagement of its sleeve E' with the thrust-bearing P at one end and a collar K on the shaft at the other end. This movement is preferably effected by means of a lever L, mounted in a yoke L', embracing the collar K and pivotally connected to a divided ring K', rotative in the collar, and also pivoted at the lower end to hangers U, projecting from the case G.

To hold the lever L in adjusted position, a spring S is provided, having a square end engaging a ledge V' on the hanger and secured in place by a pivot-screw of the lever. This end and ledge prevents lateral movement of the upper end of the spring, which end is laterally extended and convex on the side toward the lever and yieldingly engages a projection T on said lever. Said spring thus tends to hold the lever when inclined in either direction or when in mid-position.

When the clutch is released, the engine is relieved of the load and tends to "run away" unless throttled. To operate a throttle for an engine, the projection T consists of a pin longitudinally movable in the yoke L' and at its inner end engages a series of depressions M' in the lever L, which lever is rotative in the yoke and is preferably provided with a crank-wheel M and crank-pin N on its lower end to operate a longitudinally-movable rod N', projecting through the yoke and engaging a bell-crank lever O, pivoted on the case G and having attached a rod R' to operate any convenient throttle. (Not shown.) This lever is yieldingly held in contact with the rod N' by a spring O', inserted in a suitable socket on the case G. When a screw-wheel is used on the shaft A', as in boat practice, the thrust of the wheel also tends to maintain engagement of the clutch members when going ahead or backing up, and if in any event the said wheel should strike an obstruction the direction of its rotation is liable to be reversed thereby, as sufficient force might be exerted to slide the projection T on the spring S and reëngage the clutch members in their opposite rotative position.

From the foregoing description the operation of my device will be readily understood. When the clutch member H is engaged with the driving member I, the frame E is driven by the shaft A and the planet-gears will not rotate on their respective axes, but will drive the shaft A' the same as though clutched or coupled direct to the shaft A, and the sleeve E' will rotate in the bearing G' of the case. When the clutch member H is in mid-position, the frame rotates freely, and the planet-gears also rotate freely on their axes. The result is that the shaft A' stands still and the sleeve rotates independently between the same and the bearing G. When the clutch member H is engaged with the fixed member G", the frame is held stationary and the planet-gears revolve on their respective axes. Motion is thus transmitted from the shaft A to the shaft A' through the trains B, C, C', and B', thus reversing the rotation of the shaft A', which now rotates within the stationary sleeve E. In shifting the clutch as described the frame and planet-gears move longitudinally therewith, and the width of the gear B is such that the gears C' can slide longitudinally therein without disengagement therefrom.

The means described for securing the gears to the shafts is not herein claimed, but is reserved for a separate application.

I have described the preferred construction of my device; but it is evident that the same may be variously modified without departing from the spirit of my invention.

What I claim, and desire to secure by Letters Patent, is—

1. The combination of a driving-shaft, a driving-gear and a driving clutch member fixed on said shaft, a driven shaft, a driven gear fixed thereon, a frame rotative about the axis of the shafts, planet-gears journaled in the frame and connecting the gears on the shafts, a fixed clutch member, a clutch member on the frame, alternately engaging the driving clutch member and the fixed clutch member, and means for operating the latter clutch member.

2. The combination of a driving-shaft, a driving-gear, a clutch member attached to said gear, a driven shaft, a gear fixed thereon, a longitudinally-movable and rotative frame, planet-gears journaled in the frame and connecting the gears on the shafts, a case having a fixed clutch member, a clutch member on the frame and alternately engaging the case and the driving clutch member, and means for longitudinally adjusting the frame.

3. The combination of a driving-shaft, a driving-gear and driving clutch member fixed thereon, a driven shaft, a gear fixed thereon, a frame having a sleeve rotative on the driven shaft, planet-gears mounted on the frame and connecting the gears on the shafts, a case having a bearing engaging and supporting said sleeve, a fixed clutch member on the case, a clutch member on the frame and alternately engaging the clutch members on the driving-shaft and on the case, and means for adjusting the said clutch member.

4. The combination of a driving-shaft, a driving-gear and a driving clutch member fixed thereon, a longitudinally-movable driven shaft, a gear fixed thereon, a frame having a sleeve rotative on the driven shaft and longitudinally movable therewith, means for adjusting said shaft, planet-gears connecting the gears on the shafts and mounted on the frame, a case inclosing the gears and having a journal-bearing for the sleeve and a fixed clutch member, and a clutch member on the frame and alternately engaging the clutch members on the driving-shaft and on the case.

5. The combination of a driving-shaft, a conical clutch member and a driving-gear fixed thereon, a longitudinally-movable driven shaft arranged in line with the driving-shaft, means for longitudinally adjusting the driven shaft, a sleeve journaled on the driven shaft and movable therewith, a frame attached to the sleeve, a planet-gear mounted on the frame and engaging the driving-gear, a second planet-gear mounted on the frame and engaging both the first-named planet-gear and the gear on the driven shaft, a conical clutch member on the frame and engaging the clutch member on the driving-shaft and a fixed case having an inner conical surface engaged by the clutch on the frame, said case also having a bearing for the sleeve.

6. The combination of a driving-shaft having a bearing provided with a flange, a longitudinally-movable driven shaft in line with the driving-shaft, gearing and clutch mechanism connecting said shafts and operated by moving the driven shaft, a case inclosing said gearing and clutch mechanism and attached to said flange at one end and also having a bearing at the other end to support the driven shaft, and a lever pivoted to hangers on the case and connected to said shaft to adjust the same.

7. The combination of a driving-shaft, a driving-gear and clutch member fixed thereon, a longitudinally-movable driven shaft, a gear and a collar fixed thereon, a sleeve on the shaft and between the gear and collar, a frame on the sleeve, planet-gears mounted on the frame and connecting the gears on the shafts, a fixed case inclosing the gears and having a clutch member and a bearing for the sleeve, a clutch member on the frame and alternately engaging the clutch members on the driving-shaft and on the case, and a lever pivoted to hangers on the case, and connected to the collar.

In testimony whereof I affix my signature in presence of two witnesses.

WILLIS J. PERKINS.

Witnesses:
J. W. BROWN,
PALMER A. JONES.